(12) United States Patent
Djekic et al.

(10) Patent No.: US 9,525,636 B2
(45) Date of Patent: Dec. 20, 2016

(54) QOS ON A VIRTUAL INTERFACE OVER MULTI-PATH TRANSPORT

(71) Applicant: Telefonaktiebolaget L M Ericsson (publ), Stockholm (SE)

(72) Inventors: Igor Djekic, Vancouver (CA); Lars Martin, Vancouver (CA); Mohamed Abdul Malick Mohamed Usman, New Westminster (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 37 days.

(21) Appl. No.: 14/519,092

(22) Filed: Oct. 20, 2014

(65) Prior Publication Data

US 2016/0112305 A1    Apr. 21, 2016

(51) Int. Cl.
| | | |
|---|---|---|
| *H04L 12/725* | (2013.01) | |
| *H04L 12/851* | (2013.01) | |
| *H04L 12/54* | (2013.01) | |
| *H04L 12/863* | (2013.01) | |

(52) U.S. Cl.
CPC ............... *H04L 47/24* (2013.01); *H04L 12/54* (2013.01); *H04L 47/6215* (2013.01)

(58) Field of Classification Search
CPC ...... H04L 45/00; H04L 12/24; H04L 12/2602; H04L 41/00; H04L 43/00; H04L 43/024; H04L 43/045; H04L 43/065; H04L 43/067; H04L 43/0811; H04L 43/106; H04L 43/16; H04L 45/04; H04L 41/064; H04L 12/54; H04L 47/24; H04L 47/6215
See application file for complete search history.

(56) References Cited

U.S. PATENT DOCUMENTS

| | | | | |
|---|---|---|---|---|
| 6,064,677 A * | 5/2000 | Kappler | .............. | H04L 12/5602 370/395.43 |
| 6,721,316 B1 * | 4/2004 | Epps | ...................... | H04L 45/60 370/360 |
| 7,978,687 B2 * | 7/2011 | Le Roux | ................. | H04L 45/00 370/352 |

(Continued)

OTHER PUBLICATIONS

Mark Hlady, "FT2008 Unified LAG High Level Design," Mar. 17, 2011, 148 pages, Version 0.7, Ericsson Inc.

(Continued)

*Primary Examiner* — Khaled Kassim
*Assistant Examiner* — Zhaohui Yang
(74) *Attorney, Agent, or Firm* — Nicholson De Vos Webster & Elliott, LLP

(57) ABSTRACT

Exemplary methods receiving a packet of a virtual interface provisioned with a virtual interface QoS, wherein the virtual interface comprises a hierarchy of sub interfaces. The methods include selecting a virtual adjacency from a plurality of virtual adjacencies, wherein each virtual adjacency is associated with the virtual interface or a sub interface of the virtual interface. The methods include using the selected virtual adjacency to select a queue based on a priority of the packet, and store the packet in the selected queue. The methods include performing hierarchical scheduling based on the virtual interface QoS to select the queue from all sets of virtual interface queues of all virtual adjacencies, and sending the packet from the selected queue and a transport link identifier (ID) to a physical network processing unit.

20 Claims, 7 Drawing Sheets

(56) References Cited

U.S. PATENT DOCUMENTS

| | | | | |
|---|---|---|---|---|
| 2007/0280245 A1* | 12/2007 | Rosberg | .................. | H04L 47/10 |
| | | | | 370/392 |
| 2015/0006692 A1* | 1/2015 | Ramchandani | ......... | H04L 47/60 |
| | | | | 709/223 |
| 2015/0263944 A1* | 9/2015 | Tsukernik | ............... | H04L 45/74 |
| | | | | 709/244 |

OTHER PUBLICATIONS

"FT2465.5 QoS Services on Port Pseudowire," Feb. 4, 2012, 69 pages, Ericsson.

Peter Lam, "Software-based Traffic Manager (TM) High Level Design," Apr. 17, 2006, 32 pages, Version 0.5, Redback Networks Inc.

Igor Djekic, "TM Support for LNS subscribers," Jul. 4, 2005, 11 pages, Version 1.1r, Redback Networks Inc.

Satish, Jamadagni, et al., "OSPF extensions for flexible CSPF algorithm support, draft-satish-ospf-cspf-support-00," Internet Engineering Task Force (IETF), Internet Draft, Oct. 2002, 9 pages.

* cited by examiner

500

```
┌─────────────────────────────────────────────────────────┐
│ Receive a packet of a virtual interface, wherein the virtual interface is │
│ provisioned with a virtual interface QoS, and wherein the virtual interface │
│          comprises a hierarchy of sub interfaces        │
│                          505                            │
└─────────────────────────────────────────────────────────┘
                            │
                            ▼
┌─────────────────────────────────────────────────────────┐
│ Select a virtual adjacency from a plurality of virtual adjacencies maintained by │
│   a first network device based on metadata included in the packet, wherein │
│    each virtual adjacency is associated with the virtual interface or a sub │
│                 interface of the virtual interface      │
│                          510                            │
└─────────────────────────────────────────────────────────┘
                            │
                            ▼
┌─────────────────────────────────────────────────────────┐
│                Use the selected virtual adjacency to:                    │
│ select a queue from a set of virtual interface queues of the selected virtual │
│    adjacency based on a priority of the packet, and store the packet in the │
│                           selected queue               │
│                              515                        │
└─────────────────────────────────────────────────────────┘
                            │
                            ▼
┌─────────────────────────────────────────────────────────┐
│ Performing hierarchical scheduling based on the virtual interface QoS to │
│   select the queue from all sets of virtual interface queues of all virtual │
│ adjacencies, and sending the packet from the selected queue and a transport │
│  link identifier (ID) to a physical network processing unit (NPU) that is to │
│  forward the packet over a physical transport link identified by the transport │
│  link ID, to cause the physical NPU to apply a QoS on the packet based on the │
│                          transport link ID             │
│                              520                        │
└─────────────────────────────────────────────────────────┘
```

FIG. 5

QOS ON A VIRTUAL INTERFACE OVER MULTI-PATH TRANSPORT

FIELD

Embodiments of the invention relate to the field of packet networks; and more specifically, to the enforcement of Quality of Services (QoS) on a virtual interface over multi-path transport.

BACKGROUND

FIG. 1 is a block diagram illustrating a typical traffic flow over a virtual interface. As used herein, a "virtual interface" refers to any construct which is not entirely defined by its physicality. Examples of virtual interfaces include, but are not limited to, Pseudo-Wire (PW), Link Aggregation Group (LAG), Layer 2 Tunneling Protocol (L2TP) Network Server (LNS), Multilink Point-to-Point (MLPPP) multi-protocol (MP), etc. Network traffic egressing (i.e., exiting) a virtual interface can be routed over a multi-path topology. In other words, the virtual interface is connected to a physical network using multiple physical transport links. Although QoS features are typically applied on the virtual interface, each packet needs to egress out of one of the physical transport links associated with the virtual interface. Each physical transport link can be shared by other interfaces and may have its own QoS hierarchy.

Conventionally, QoS are implemented on a virtual interface using either the distributed service model (as illustrated in FIG. 2) or the pinned service model (as illustrated in FIG. 3). In the distributed service model, QoS resources are replicated on each physical transport link. This model allows for the multi-path topology to be fully utilized. In the pinned service model, QoS resources are pinned to a particular egress physical transport link. This model allows for efficient utilization of resources and virtual interface aggregate level shaping.

The distributed service model, however, suffers multiple drawbacks. For example, this model requires QoS resources to be replicated across each of the physical transport links. Further, in the distributed service model, virtual interface aggregate level shaping and metering are unachievable. The pinned service model also suffers multiple drawbacks. For example, this model restricts the ability of forwarding to use multi-path topology. In both models, the virtual interfaces are tightly coupled to the physical transport links, which is not well suited for network function virtualization (NFV).

SUMMARY

Exemplary methods performed by a first network device for applying Quality-of-Service (QoS) on a virtual interface over a multi-path transport topology includes receiving a packet of the virtual interface, wherein the virtual interface is provisioned with a virtual interface QoS, and wherein the virtual interface comprises a hierarchy of sub interfaces. The methods include selecting a virtual adjacency from a plurality of virtual adjacencies maintained by the first network device based on metadata included in the packet, wherein each virtual adjacency is associated with the virtual interface or a sub interface of the virtual interface. In one embodiment, the methods include using the selected virtual adjacency to select a queue from a set of virtual interface queues of the selected virtual adjacency based on a priority of the packet, and store the packet in the selected queue.

In one embodiment, the methods include performing hierarchical scheduling based on the virtual interface QoS to select the queue from all sets of virtual interface queues of all virtual adjacencies, and sending the packet from the selected queue and a transport link identifier (ID) to a physical network processing unit (NPU) that is to forward the packet over a physical transport link identified by the transport link ID, to cause the physical NPU to apply a QoS on the packet based on the transport link ID. In one embodiment, the methods include generating the transport link ID based on metadata included as part of the packet.

In one embodiment, the methods further include using the selected virtual adjacency to generate a packet priority and a packet color for the packet, wherein the packet priority and the packet color are sent along with the packet to the physical NPU, to cause the physical NPU to use the packet color and packet priority to determine whether to drop the packet or to queue the packet, and to further cause the physical NPU to use the packet priority to select a queue from a set of virtual interface queues associated with the virtual interface at the physical NPU for queueing the packet.

In one embodiment, all traffic of the virtual interface is sent to the first network device, thereby allowing the first network device to enforce a consistent throughput over the virtual interface regardless of how many physical transport links the virtual interface traffic is directed to. In one embodiment, the physical NPU is implemented at a second network device communicatively coupled to the first network device.

Exemplary methods performed by a first network device for applying Quality-of-Service (QoS) on a virtual interface over a multi-path transport topology includes receiving a packet of the virtual interface from a service home network processing unit (NPU), wherein the virtual interface has been provisioned with a virtual interface QoS, wherein the service home NPU has applied the virtual interface QoS on the packet, and wherein the packet includes a physical transport link identifier (ID) that identifies a physical transport link over which the packet is to be forwarded by the first network device.

In one embodiment, the methods include selecting a virtual adjacency from a plurality of virtual adjacencies maintained by the first network device based on metadata included in the packet, wherein each virtual adjacency is associated with a virtual interface.

In one embodiment, the methods include using the selected virtual adjacency to select a queue based on the physical transport link ID, and store the packet in the selected queue. The methods further include performing scheduling to select the queue, and sending the packet from the selected queue over the physical transport link.

In one embodiment, selecting the queue includes selecting a set of virtual interface queues associated with the virtual interface based on the physical transport link ID, and selecting the queue from the selected set of virtual interface queues based on a packet priority included in the packet. In one embodiment, the methods further include using the selected virtual adjacency to select a drop profile from a set of drop profiles associated with the selected queue based on a packet color included in the packet, and determine whether or not to drop the packet based on the selected drop profile.

In one embodiment, performing scheduling to select the queue includes selecting the queue from all sets of virtual interface queues of all virtual adjacencies based on a bandwidth share parameter associated with the virtual interface, wherein the bandwidth share parameter indicates a minimum share of a bandwidth on the physical transport link that is guaranteed to the virtual interface. In one embodiment, the service home NPU is implemented at a second network device communicatively coupled to the first network device.

BRIEF DESCRIPTION OF THE DRAWINGS

The invention may best be understood by referring to the following description and accompanying drawings that are used to illustrate embodiments of the invention. In the drawings:

FIG. 5 is a flow diagram illustrating a method for applying QoS on a virtual interface over a multi-path topology, according to one embodiment.

DESCRIPTION OF EMBODIMENTS

Figure 1:
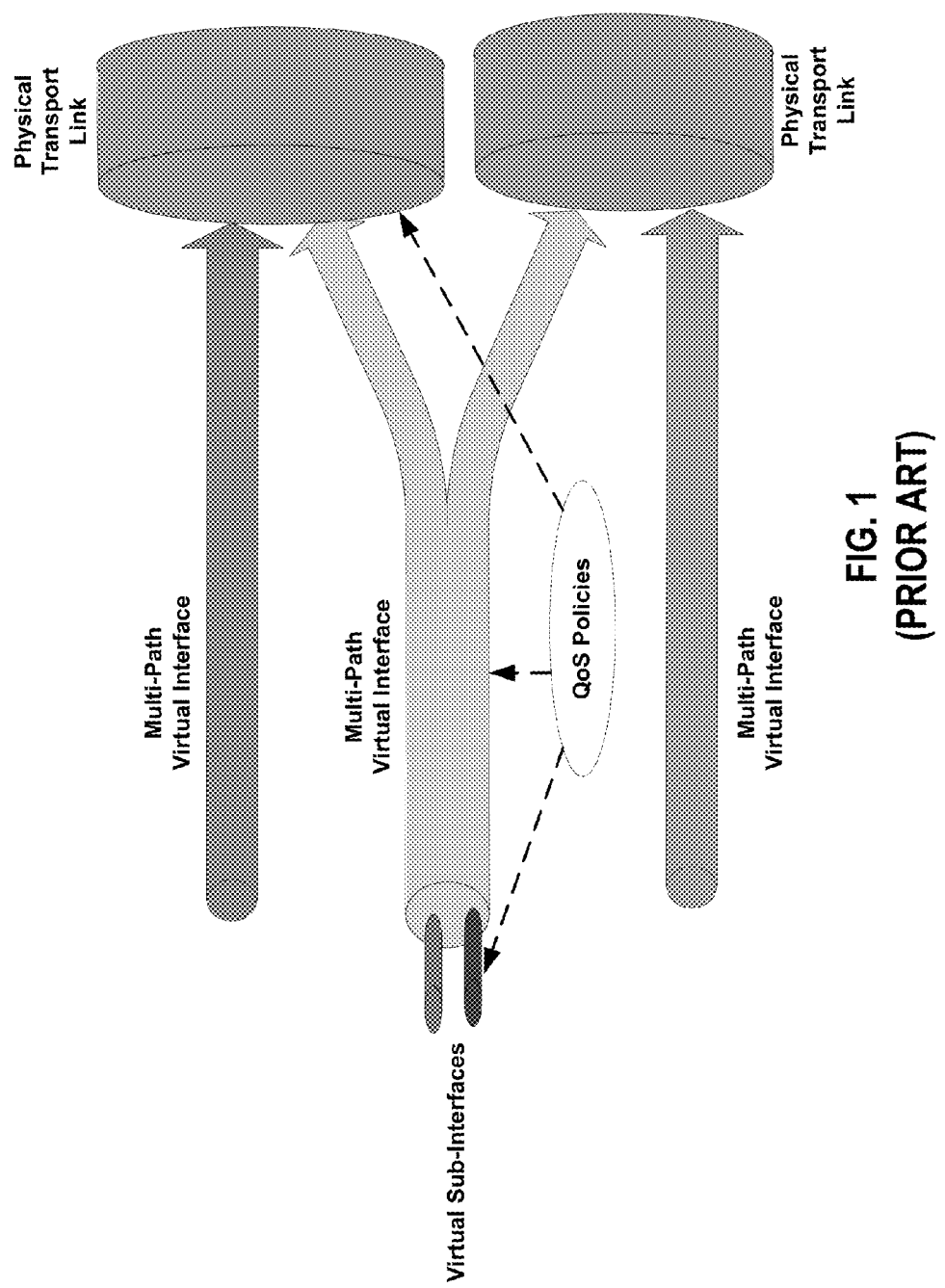
FIG. 1 is a block diagram illustrating the traffic flow of a virtual interface over a multi-path topology.
Figure 2:
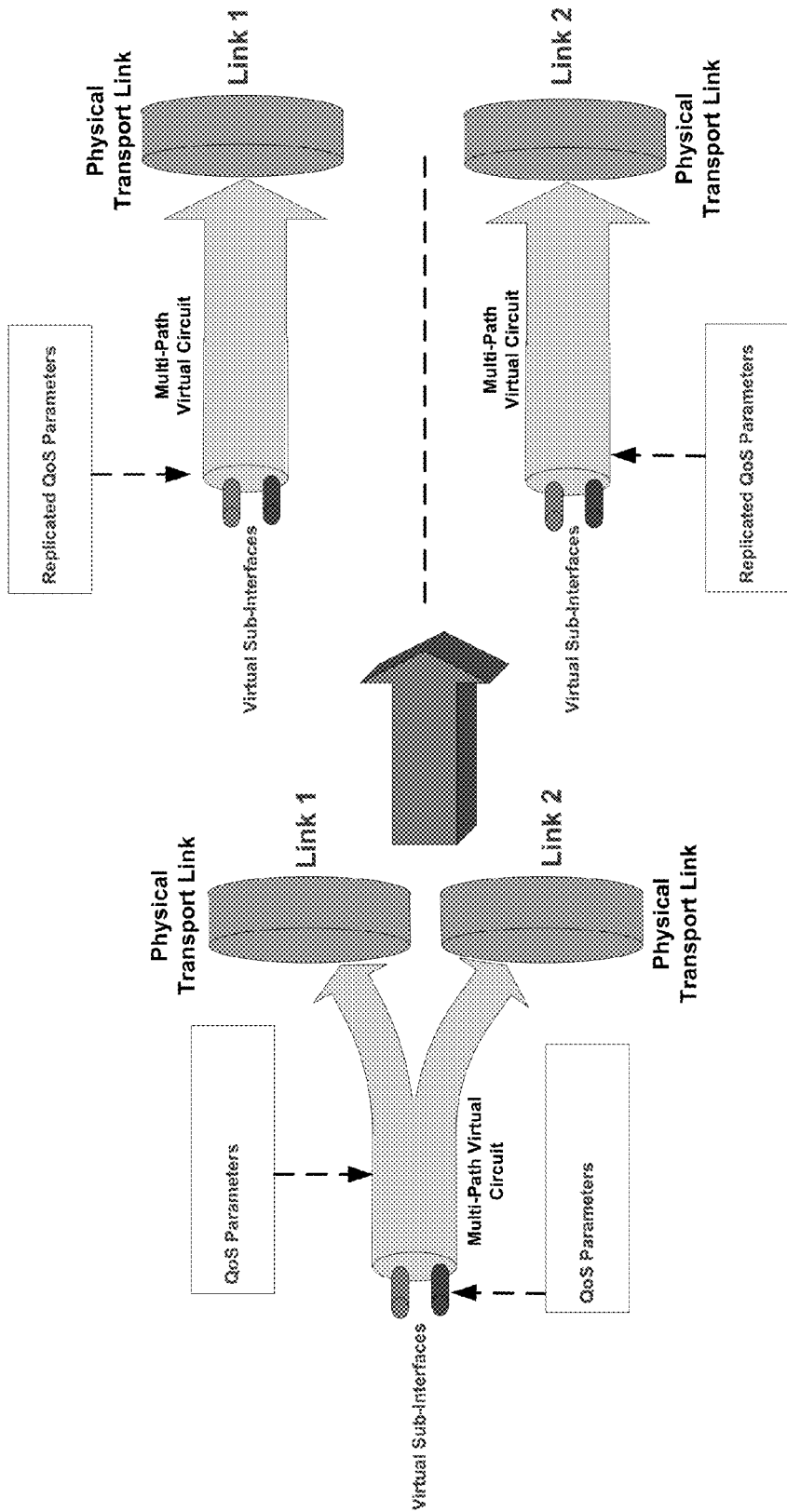
FIG. 2 is a block diagram illustrating a conventional implementation of QoS on a virtual interface using the distributed service model.
Figure 3:
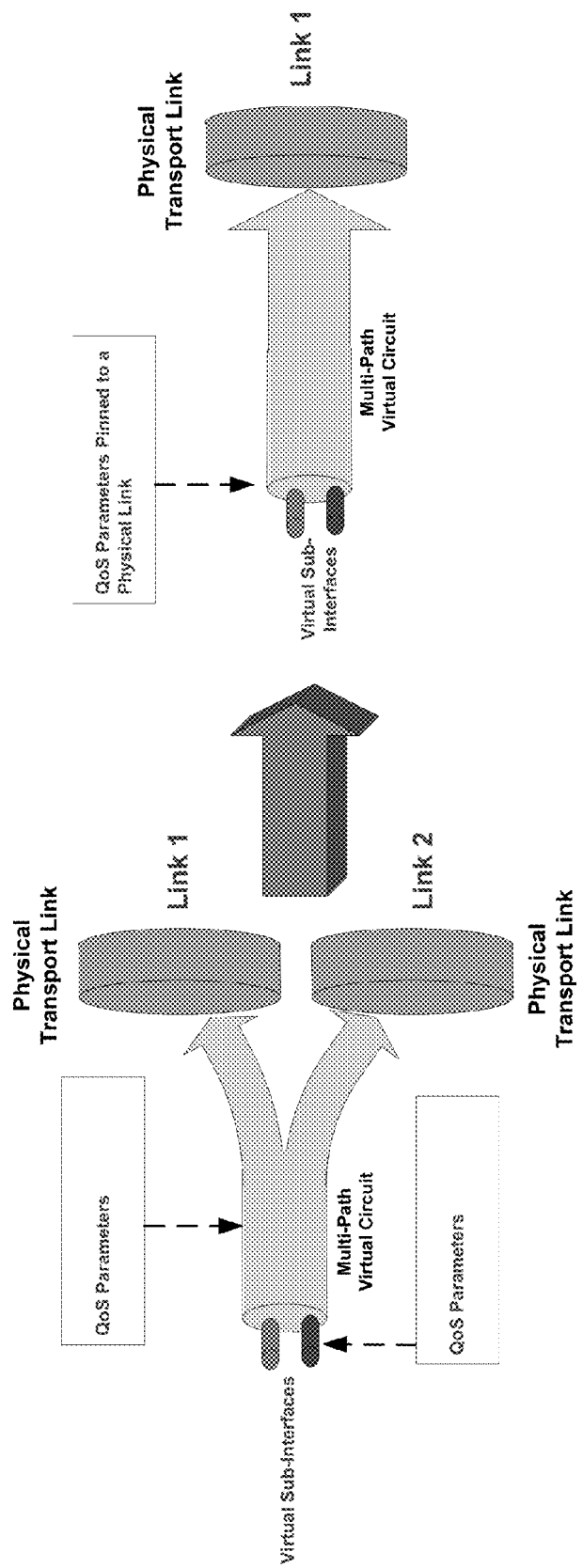
FIG. 3 is a block diagram illustrating a conventional implementation of QoS on a virtual interface using the pinned service model.

The following description describes methods and apparatuses for enforcing QoS on a virtual interface over a multi-path transport. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device or a computing device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Conventional methods for providing QoS on a virtual interface routed over a multi-path topology suffer from multiple limitations. Embodiments of the present invention overcome such limitations by providing mechanisms that allow:

1. Load-balancing and packet-hashed forwarding over multiple transport links while honoring aggregate QoS on a virtual interface.

2. Hierarchical coupling of QoS behavior on the virtual interface with that of the physical transport links which lie after the virtual interface aggregate point and represent the final point of exit in the packet forwarding path.
3. Maintaining consistent aggregate throughput and priority order over the virtual interface regardless of the distribution of transport links across different exit points within a network device.
4. De-coupling the virtual interface from physical transport link scheduling, thereby making it suitable for NFV.

Throughout the description, references are made to "QoS". As used herein, "QoS" refers to a set of (optional) policing, queueing, and scheduling policies that are applied (individually or in any combination thereof) to network traffic in order to enforce various predetermined "quality of services" (e.g., maximum/minimum rate, maximum/minimum burst, weight, priority, congestion avoidance attributes, etc.) As used herein, "policing policies" provide rate-limiting of traffic in a manner that is different from shaping. Traffic policing, for example, can result in a packet being dropped in order to avoid exceeding the defined rate limit. Traffic shaping, on the other hand, can result in a packet being buffered (e.g., through scheduling deferral decisions) until it can be transmitted without exceeding the defined rate limit. Traffic policing can be applied to multiple classes of traffic, and the policing results can be combined across the hierarchical levels, as well as packet marking which can either be based on rate-limiting results, conditioned on traffic-class only, or fully unconditional.

As used herein, "marking a packet" refers to generating/assigning a packet with a color and/or a priority based on the current packet rate. Here, a "packet color" refers to its drop precedence. For example, a color "red" indicates the packet has high drop precedence (making it more likely to be dropped by the queue congestion management mechanism), while a color "green" indicates the packet has low drop precedence (making less likely to be dropped by the queue congestion management mechanism). It shall be understood that other colors can be included as part of the packet marking mechanism. Results of policing (e.g., packet color and/or priority) are propagated to queuing, where queue congestion management and queue selection are performed.

As used herein, "queueing policies" refer to queue congestion management and packet queueing. Queue congestion management refers to the determination of whether packets are to be dropped or queued based on its color. Packet queuing may be based on packet color and/or packet priority. For example, based on a packet's priority, a queue is first selected. Each queue is associated with a plurality of drop profiles. One drop profile is selected based on the packet color, and a congestion management algorithm (e.g., the weighted random early detection (WRED) algorithm) is applied using the selected drop profile. It shall be understood that any congestion algorithm can be applied to perform congestion management. The result is that the packet is either dropped or queued into a queue that is selected based on its priority.

As used herein, "scheduling policies" determine how packets are scheduled, including prioritization of traffic between different queues, or sets of queues, shaping of the traffic within the queues or sets of queues. As used herein, "scheduling" refers to the process of selecting a packet from one of the multiple packet queues for transmission. There can be a hierarchy of queues that belong to a hierarchy of sub interfaces of a virtual interface. In such an embodiment, the scheduling is performed hierarchically, described in further details below. The queue selection is based on various criteria including queue priority which is referred to as prioritization. Scheduling can also be based on an adherence to a set of defined rate limits which is referred to as traffic shaping. As described above, QoS refers to a set of optional policing, queuing, and scheduling policy that can be applied in any combination thereof. Thus, "applying a QoS" refers to the application of optional policing policy, and/or queueing policy, and/or scheduling policy.

Throughout the description, references are made to a virtual interface. It shall be understood that a virtual interface can comprise of a hierarchy of sub interfaces. Here, a "hierarchy of sub interfaces" refers to the notion that a virtual interface includes one or more sub interfaces, and that each of these sub interfaces may comprise of one or more other sub interfaces, which in turn may include other sub interfaces, and so on, thus forming a "hierarchy" of sub interfaces.

Each sub interface is associated with (i.e., provisioned) a QoS (commonly referred to as the "sub interface QoS"). As used herein, a "sub interface QoS" refers to the QoS that is applied/enforced at each sub interface to determine how packets should be queued, and how scheduling should be performed at that sub interface. For example, each sub interface QoS may specify the minimum/maximum rate, minimum/maximum burst, weight, priority, and queue congestion avoidance/handling attributes for the respective sub interface. In addition to the sub interface QoS provisioned for each of the sub interfaces, the virtual interface is also provisioned with a virtual interface QoS. As used herein, the "virtual interface QoS" refers to the QoS that is applied/enforced on the entire virtual interface to determine how packets should be queued, and how scheduling should be performed at the virtual interface, where all sub interface traffic is aggregated. For example, the virtual interface QoS may specify the minimum/maximum rate, minimum/maximum burst, weight, priority, and queue congestion avoidance/handling attributes for the entire virtual interface.

By way of example, suppose that a virtual interface comprises of a hierarchy of four sub interfaces (herein referred to as sub interfaces A, B, C, and D), which have been assigned the sub interface QoS A, B, C, and D, respectively. In this example, assume that sub interfaces A and B are immediately below the virtual interface, and that sub interfaces C and D are immediately below sub interface A. In other words, the virtual interface comprises of sub interfaces A and B, and sub interface A comprises sub interfaces C and D. Note here that traffic may be transmitted on each sub interface, and that each sub interface serves as an aggregate point for sub interfaces below it. In cases where traffic is sent on the sub interface (i.e., the sub interface is not just an aggregate point), the sub interface is associated with a set of virtual interface queues (which are interchangeably referred to as VI-Qs). Note further that the virtual interface serves as an aggregate point for all its sub interfaces, and that traffic may also be transmitted on the virtual interface itself (i.e., traffic is not required to be transmitted on sub interfaces only). In cases where traffic is also sent on the virtual interface, the virtual interface is also associated with a set of VI-Qs, which must compete for bandwidth with other queues from the sub interfaces. For the sake of simplicity, however, the description shall herein only refer to the sub interfaces. It shall be understood, however, that the policing, queuing, and scheduling mechanisms described herein apply equally to the virtual interface in cases where traffic are sent at the virtual interface level.

In the hierarchy of sub interfaces described above, the packets of each sub interface are policed (i.e., dropped or assigned a packet color/priority) using a policing policy associated with the respective sub interface QoS. For example, a policer of a sub interface determines whether to drop a packet or mark it with a priority/color based on the current packet rate. In response to determining not to drop the packet, the policer passes the packet to a queue manager associated with the sub interface QoS. The queue manager selects a queue from the set of VI-Qs associated with the sub interface based on the packet priority. Each queue is associated with a plurality of drop profiles. The queue manager selects a drop profile based on the packet color, and applies a congestion algorithm using the selected drop profile. In response to determining not to drop the packet, the queue manager inserts the packet in the selected queue. Thus, packets are policed and queued at each sub interface based on its own sub interface QoS parameters such as priority and queue congestion avoidance attributes (i.e., drop profiles).

In order to perform packet scheduling under a hierarchy of sub interfaces, a hierarchy of scheduling nodes are implemented/configured for the virtual interface. Throughout the description, the hierarchy of scheduling nodes are interchangeably referred to as a "scheduling cone". Each scheduling node of the scheduling cone is configured to schedule queues based on its sub interface QoS (except for the scheduling node at the virtual interface level, which schedules queues based on its virtual interface QoS). Continuing on with the above example, a first level of the scheduling cone comprises of a first scheduling node (associated with sub interface QoS C) configured to select a queue from the set of VI-Qs that are associated with sub interface C, wherein the queue is selected based on the sub interface QoS associated with (i.e., provisioned for) sub interface C. For example, the queue may be selected based on the maximum/minimum rate, maximum/minimum burst, and priority provisioned as part of the sub interface QoS. The first level of the scheduling cone further includes a second scheduling node (associated with sub interface QoS D) configured to select a queue from the set of VI-Qs that are associated with sub interface D based on its provisioned sub interface QoS. The winning queues selected by the first and second scheduling nodes of the first level are sent to a second level of the scheduling cone.

The second level of the scheduling cone comprises of a first scheduling node (associated with sub interface QoS A) configured to select a queue either from the winning queues the first level of the scheduling cone (i.e., the winning queue from sub interface C or D) or select a queue from the set of VI-Qs that are associated with sub interface A based on its sub interface QoS. In other words, this scheduling node may select the queue from its own VI-Qs or from the winning queues which were selected by the scheduling nodes below it. The selection of the queue is based on, for example, the maximum/minimum rate, maximum/minimum burst, and priority provisioned as part of the sub interface QoS A. The second level of the scheduling cone further includes a second scheduling node (associated with sub interface QoS B) configured to select a queue from the set of VI-Qs that are associated with sub interface B based on its sub interface QoS. It is to be noted here that sub interface B is not configured to serve as an aggregate point (i.e., there are no sub interfaces below it), and thus its VI-Qs do not have to compete with winning queues from scheduling nodes below it. The winning queues selected by the first and second scheduling nodes of the second level are sent to a third level of the scheduling cone, which in this example, is the final scheduling level of the hierarchy.

The third level of the scheduling cone comprises a scheduling node (associated with the virtual interface QoS) is configured to select a queue either from the winning queue of the first scheduling node or the second scheduling node of the second level (i.e., either the winning queue from sub interface A or B) based on the virtual interface QoS provisioned at the virtual interface level. A packet is then de-queued from the winning queue of the third/final level, and transmitted. Thus, the packet which is selected for transmission is hierarchically scheduled based on all the sub interface QoS and further based on the virtual interface QoS.

It should be noted that in the above example, if traffic is also transmitted at the virtual interface level (e.g., in addition to the sub interfaces), then a set of VI-Qs must also be provisioned for the virtual interface. The packets at this virtual interface level are policed and queued based on the virtual interface QoS. Further, the VI-Qs at the virtual interface level must compete for bandwidth with the winning queues from the sub interfaces below the virtual interface. In the above example, the first level of the scheduling cone shall be referred to as the "lowest level", and the third level of the scheduling cone shall be referred to as the "highest level".

A network device, as used herein, includes one or more slots. A card (e.g., a line card, service card, etc.) is hot pluggable into each slot. Line cards make up the data plane, while the control cards provide the control plane and exchange packets with other network devices through the line cards. Each line card includes one or more network processing units (NPUs). As used herein, an NPU refers to a collection of software and/or hardware resources (e.g., one or more processors, memory, communication interfaces, etc.) responsible for performing the forwarding function. Each NPU includes one or more physical transport links, over which packets are exchanged with other network devices.

According to one embodiment, packets that belong to a virtual interface which have QoS policies attached to them, are first forwarded to the virtual interface's "service home NPU", where policing and queuing of packets at each of the sub interface and/or at the virtual interface based on the sub interface QoS and/or the virtual interface QoS, respectively, are performed. As used herein, a "service home NPU" refers to an NPU (i.e., single physical location) where the virtual interface QoS is applied. As used herein, "virtual interface QoS application" refers to the hierarchical scheduling of a queue as described above. For example, each scheduling node performs scheduling based on its sub interface QoS to select a winning queue (either from its own VI-Qs or winning queues from the scheduling node below it).

The winning queue is then propagated to the scheduling node above it, which in turn performs scheduling based on its sub interface QoS to select a winning queue (either from its own VI-Qs or winning queues from the scheduling node below it). Hierarchical scheduling is performed until the "top" of the scheduling cone is reached, where scheduling is performed based on the virtual interface QoS to select a winning queue (either from its own VI-Qs or winning queues from the scheduling nodes below it). Thus, it should be understood that a winning packet of the scheduling cone (i.e., the packet de-queued from the winning queue at the top of the scheduling cone) can come from any level of the hierarchy of sub interfaces (i.e., the winning packet can be from any of the sub interface or the virtual interface).

It should be noted that the winning packet, although it can come from any of the sub interfaces, must necessarily adhere to the virtual interface QoS, otherwise, it would not have been scheduled by the top scheduling node. For example, a queue may propagate from the bottom of the hierarchy of sub interfaces all the way up to the top, but if its rate, burst, or priority does not adhere to the virtual interface QoS, it will not be scheduled. In one embodiment, the top scheduling node is configured to limit the rate and burst of the traffic to a predetermined rate (e.g., maximum rate) and a predetermined burst (e.g., maximum burst), respectively. Thus, traffic exiting the service home NPU can be limited at, for example, the maximum rate and maximum burst, providing for a consistent throughput over the virtual interface.

Subsequently, the winning packets (i.e., those which adhere to the virtual interface QoS, e.g., packets which have not exceeded the provisioned maximum rate and maximum burst) are forwarded to one or more egress points. The egress point shall herein be referred to as the "physical NPU". The physical NPU can be the same as or different NPU from the service home NPU. Further, the service home NPU and the physical NPU may be on the same or different line cards. The service home NPU and physical NPUs may even be on different network devices. Each physical NPU is selected by a multi-path link selection algorithm implemented as part of the ingress forwarding path.

The results of the QoS applied at the service home NPU are propagated to the physical transport links of the physical NPU, where another QoS is applied. In one embodiment, the "QoS application results" include, but are not limited to, the color, priority, and transport link ID of the winning packet. The physical NPU uses the transport link ID identify a set of resources (e.g., optional policing policies, queueing policies, virtual interface queues, etc.).

In an embodiment where policers are implemented, the packet color from the service home NPU may be combined with (i.e., modified by) the color assigned by the policer of the physical transport link at the physical NPU. The combined/modified color and the priority from the service home NPU are then used by the physical transport link to perform queue congestion management and queue selection. In an embodiment where the physical transport link is not configured with policing policies, the physical transport link is to use the color and priority provided by the service home NPU for performing queue congestion management and queue selection.

In some embodiments, the physical transport links of the physical NPU are shared by multiple virtual interfaces. In such embodiments, each physical transport link is configured with a bandwidth share parameter for each virtual interface. As used herein, a "bandwidth share parameter" refers to an amount of bandwidth that is reserved on a physical transport link for a corresponding virtual interface. The bandwidth share parameter, for example, can be used to guarantee that the corresponding virtual interface will have at least a predetermined minimum bandwidth on the physical transport link. The packets then exit the physical NPU using one or more of its physical transport links.

As described above, packets that belong to a virtual interface are sent to a service home NPU. The service home NPU is selected by the configuration plane software, for example, the module which owns the particular virtual interface type. By way of example, in the case of PW, LNS, MLPPP, and LAG, the owner module would be the PW/multiprotocol label switching (MPLS) daemon, L2TP daemon, PPP daemon, link-group daemon, respectively. It should be noted that the owner module has to manage multiple instances of its own virtual interface type and each module should balance the load on multiple NPUs by distributing virtual interface instances across different service home NPUs. Service home NPU assignment is to be propagated to the routing modules/daemons, where the route across the virtual interface will be set up over the service home NPU, regardless of the location of physical transport links. In other words, the control software which manages the network device should set up the forwarding database so that traffic entering the ingress line cards are routed to the service home NPU.

Embodiments of the present invention, by forwarding all traffic of the virtual interface to a single service home NPU (where virtual interface QoS is applied) and propagating the QoS application results to the physical NPU (where physical transport link level QoS is applied), maintain a consistent aggregate level throughput (e.g., maximum/minimum rate and maximum/minimum burst) and priority order over the virtual interface regardless of the distribution of the virtual interface traffic over multiple physical transport links across different exit points (which may have varying levels of QoS). In other words, by applying virtual interface QoS on all traffic of a virtual interface at a single point, aggregate level throughput can be guaranteed to be honored regardless of which physical transport link the packets are eventually routed to. By propagating the virtual interface QoS application results to the physical NPU, embodiments of the present invention ensures packets are prioritized and queue congestion are handled in a manner such that they are consistent with the virtual interface QoS, regardless of which physical transport link the traffic is routed to.

In contrast, a conventional method of QoS application on a virtual interface over a multi-path transport topology cannot achieve such consistency because each physical transport link is associated with its own physical transport link level QoS, and the transmission characteristics of the packets are only bounded by the physical transport link level QoS. These physical transport link level QoS (either individually or cumulatively) may, for example, exceed the virtual interface QoS (e.g., maximum rate and maximum burst) of the virtual interface, thus violating the throughput restriction of the virtual interface QoS provisioned at the virtual interface level. Further, each of these conventional transport link level QoS does not take into account the results of the QoS application at the virtual interface level, and thus, packets may be prioritized and/or congestion may be handled inconsistently among the physical transport links, even though all the traffic belong to the same virtual interface.

By way of example, assume that a virtual interface has been assigned a virtual interface QoS "a", and the physical transport links can support physical transport link level QoS "b" and "c". Conventionally, the QoS that gets applied to the virtual interface traffic depends on the physical transport link it gets routed to. For example, QoS "b" or "c" may be enforced on the virtual interface traffic even though the virtual interface has been provisioned with QoS "a". In contrast, by using the mechanisms of the present invention, the virtual interface traffic will be subject to QoS "a" regardless of which physical transport link the traffic gets routed to. Embodiments of the present invention shall become apparent through the discussion of various figures below.

Figure 4:
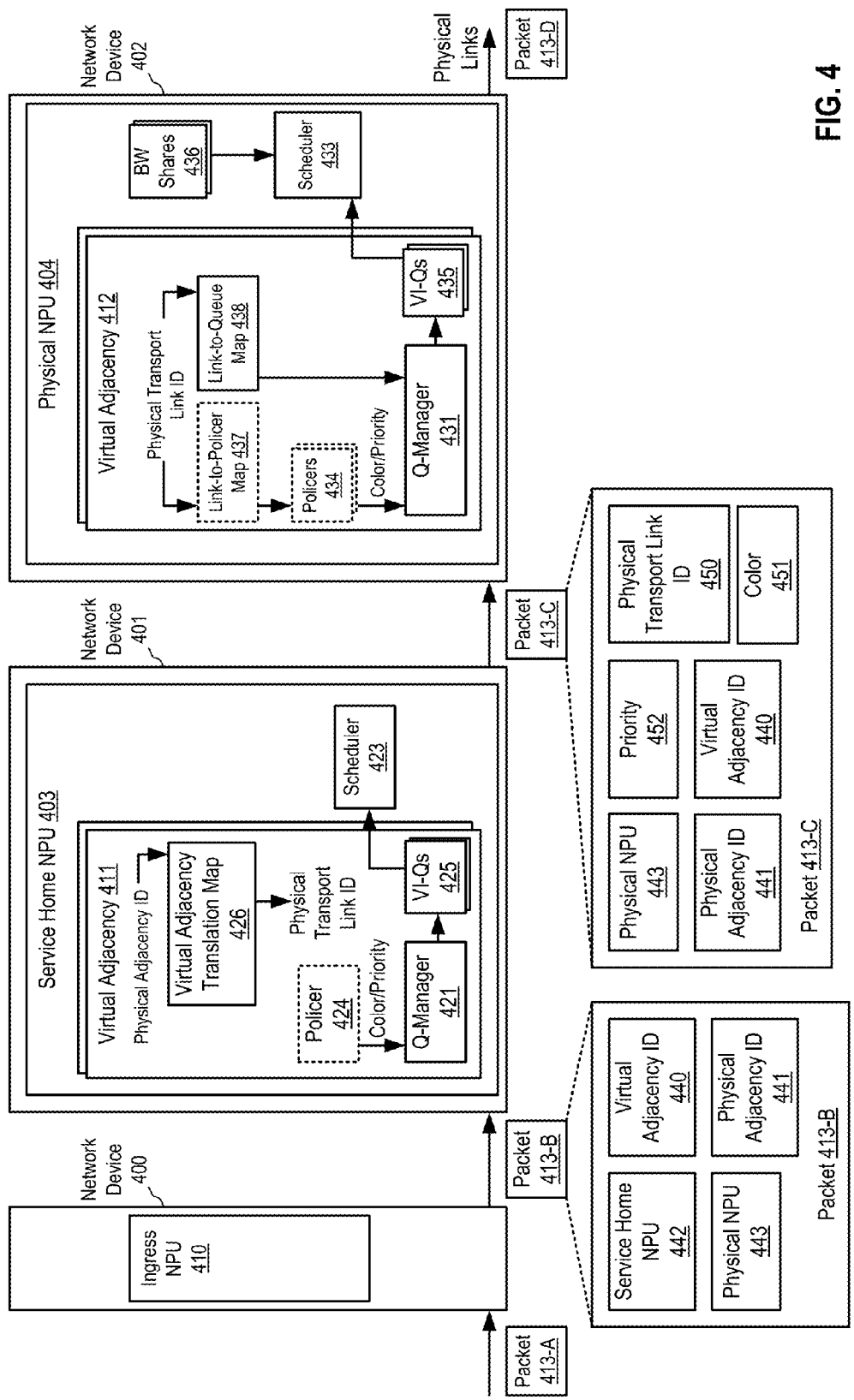
FIG. 4 is a block diagram illustrating a network comprising of network devices for applying QoS on a virtual interface over a multi-path topology, according to one embodiment.

FIG. 4 is a block diagram illustrating a network comprising of network devices 400-402 communicatively coupled to each other. In this example, network devices 400-402 include ingress NPU 410, service home NPU 403, and physical NPU 404, respectively. The distribution of these NPUs over three network devices are shown for illustrative purposes, and not intended to be limitations of the present invention. It is to be appreciated that ingress NPU 410, service home NPU 403, and physical NPU 404 can be arranged/located in any combination of network devices. For example, ingress NPU 410, service home NPU 403, and physical NPU 404 may all be in the same network device. By way of further example, ingress NPU 410 and physical NPU 404 may be on one network device while service home NPU 403 may be on a different network device.

According to one embodiment, in response to receiving a packet, ingress NPU 410 is configured to determine the packet's virtual adjacency, service home NPU, physical adjacency, and physical NPU, for example, by using the packet header information (e.g., addressing information) to lookup a forwarding database. In one embodiment, the information identifying the determined virtual adjacency, service home NPU, physical adjacency, and physical NPU are encapsulated onto the packet as metadata. In this example, ingress NPU 410 receives packet 413-A which may include a payload (not shown). Ingress NPU 410 encapsulates the information identifying the virtual adjacency, service home NPU, physical adjacency, and physical NPU of packet 413-A into virtual adjacency ID 440, service home NPU 442, physical adjacency ID 441, and physical NPU 443, respectively, of packet 413-B, and sends it towards service home NPU 403.

Each physical transport link is associated with its own physical transport link level QoS. Conventionally, virtual interface traffic, when sent to the physical transport link, is subject only to the physical transport link level QoS. The result is that when multiple physical transport links are used to carry the virtual interface traffic, the aggregate bandwidth over the multiple physical transport links may exceed the virtual interface QoS that was provisioned on the virtual interface. Embodiments of the present invention overcome these limitations by directing all traffic of a virtual interface to a single service home NPU. In this way, the throughput of the virtual traffic is consistent, regardless of which physical transport links the traffic gets routed to. The service home NPU, for example, can be configured to enforce the maximum rate and maximum burst provisioned as part of the virtual interface QoS.

Service home NPU 403 shall now be described with reference to the hierarchy of sub interfaces example described above. Virtual interface traffic, as described above, can be sent at the virtual interface as well as the sub interfaces. In one embodiment, service home NPU 403 includes a plurality of virtual adjacencies, wherein each virtual adjacency is associated with a sub interface or the virtual interface over which the traffic is sent. Each virtual adjacency is configured to apply the sub interface QoS provisioned for the sub interface that the virtual adjacency is associated with. In the case of the virtual interface, a virtual adjacency is configured to apply the virtual interface QoS that the virtual adjacency is associated with. For the sake of simplicity and clarity in the description, however, the virtual adjacencies shall herein be described only in the context of sub interfaces. It should be understood, however, that the operations/functions of the virtual adjacency described herein apply equally to the virtual interface (i.e., the virtual adjacency can also be used to apply the virtual interface QoS provisioned for the virtual interface). By of example, in the hierarchy of sub interfaces example described above, service home NPU 403 would include a virtual adjacency for each of the sub interfaces A, B, C, and D.

In response to receiving a packet, service home NPU 403 sends the packet to a virtual adjacency identified by the virtual adjacency ID included in the packet. In the illustrated example, service home NPU 403 receives packet 4130B, and based on the identifier contained in virtual adjacency ID 440, service home NPU 403 sends the packet to virtual adjacency 411.

Virtual adjacency 411 includes optional policer 424, queue manager 421, and VI-Qs 425, for applying the sub interface QoS provisioned for the sub interface that virtual adjacency 411 is associated with. In one embodiment, virtual adjacency 411 is configured to generate a packet color and/or priority for each ingress packet. As used herein, "generating a packet color/priority" refers to accessing the packet color/priority encapsulated in the ingress packet (e.g., packet 413-B), and encapsulating the accessed packet color/priority in the egress packet (e.g., packet 413-C) prior to sending it over to a physical NPU (e.g., physical NPU 404). Alternatively, "generating a packet color/priority" can refer to the assignment of a packet color/priority by an optional "color aware" policer implemented at virtual adjacency 411.

In the illustrated embodiment, virtual adjacency 411 includes optional policer 424 configured to apply a policing policy, wherein the policing policy is associated with the sub interface QoS that virtual adjacency 411 is configured to apply. Here, applying the policing policy refers to the monitoring the packet rate of packets flowing through virtual adjacency 411 and determining whether the packets adhere to the predetermined packet rate. In one embodiment, policer 424 is "color aware". As used herein, a "color aware policer" refers to a policer that takes as input a color assigned by a policer in a previous stage, and can either maintain, promote, or demote the color. For example, policer 424 may maintain a packet color that was embedded in an ingress packet (e.g., packet 413-B). Alternatively, policer 424 may demote a packet color, for example, by modifying an incoming packet marked with a color "green" to a color "red". Conversely, policer 424 may promote a color, for example, by modifying an incoming packet marked with a color "red" color to a color "green".

In response to determining a packet does not adhere to the predetermined rate, policer 424 drops/discards the packet. Alternatively, in response to determining a packet adheres to the predetermined rate, policer 424 marks the packet (i.e., assigns it a color and priority) based on the current packet rate. Again, this may be the same color, demoted color, or promoted color. In an embodiment where policer 424 is implemented, the color assigned by policer 424 is used by queue manager 421. In an alternate embodiment where policer 424 is not implemented, the packet color included as part of the incoming packet is used by queue manager 421.

In one embodiment, virtual adjacency 411 includes queue manager 421 configured to apply a queueing policy, wherein the queueing policy is associated with the sub interface QoS that virtual adjacency 411 is configured to apply. Here, applying the queuing policy refers performing queue congestion management/avoidance and packet queueing. In one embodiment, queue manager 421 applies the queueing policy to select a drop profile and apply it to a congestion algorithm (e.g., WRED). For example, queue manager 421 is to determine which queue of VI-Qs 425 a packet should be inserted in based on the priority of the packet. In one embodiment, each queue of VI-Qs 425 is associated with a plurality of drop profiles which define whether a packet is to be dropped based on various parameters.

In one embodiment, queue manager 421 applies the queuing policy to select a drop profile from the plurality of drop files associated with the selected queue based on the packet color. Queue manager 421 then applies the selected drop profile on a congestion algorithm (e.g., WRED) to determine whether the packet should be dropped or inserted into the selected queue. In response to determining not to drop a packet, queue manager 421 applies the queueing policy to insert the packet into the selected queue. Thus, by including queue manager 421 and optional policer 424, virtual adjacency 411 is able to apply/enforce the sub interface QoS parameters (e.g., priority and congestion avoidance attributes).

According to one embodiment, service home NPU 403 includes scheduler 423 which represents the scheduling cone described above, i.e., scheduler 423 performs the operations of the scheduling nodes of each level of the scheduling cone. In the hierarchy of sub interfaces described in the above example, scheduler 423 would select a queue from the VI-Qs of the virtual adjacency associated with sub interface C based on its provisioned sub interface QoS C. Further, scheduler 423 would select a queue from the VI-Qs of the virtual adjacency associated with sub interface D based on its provisioned sub interface QoS D. The winning queue from sub interface C and the winning queue from sub interface D are then passed to the next level.

Continuing on with the above example, scheduler 423 then selects a queue either from the winning queues of the first level (i.e., the winning queue from sub interface C or D) or from the VI-Qs of the virtual adjacency associated with sub interface A based on its provisioned sub interface QoS A. Further, scheduler 423 would select a queue from the VI-Qs of the virtual adjacency associated with sub interface B based on its provisioned sub interface QoS B. The winning queue from sub interface A and the winning queue from sub interface B are then passed to the next level.

Referring still the above example, scheduler 423 then selects a queue from the winning queues of the second level (i.e., the winning queues from sub interface A or B) based on the virtual interface QoS provisioned for the virtual interface. A winning packet is then de-queued from the winning queue selected at the final/highest level, and sent to the physical NPU. In the illustrated example, scheduler 423 has de-queued packet 413-C from the winning queue and sent it to physical NPU 404.

It should be noted that in the above example, if traffic is also transmitted at the virtual interface level (e.g., in addition to the sub interfaces), then a virtual adjacency must also be implemented as part of service home NPU 403 to apply the virtual interface QoS for policing and queuing of packets to be sent at the virtual interface level. Further, scheduler 423 must consider the VI-Qs of this virtual adjacency when performing scheduling at the top of the scheduling cone.

It should be noted that once a winning packet has been scheduled from a virtual adjacency and sent to its physical NPU, the winning packet has been subjected to the virtual interface QoS. That is to say, although the winning packet can come from any of the sub interfaces (i.e., any virtual adjacency), it must necessarily adhere to the virtual interface QoS, otherwise, it would not have been scheduled by the top scheduling node. For example, a queue may propagate from the bottom of the hierarchy of sub interfaces all the way up to the top, but if its rate, burst, or priority does not adhere to the virtual interface QoS, it will not be scheduled. In one embodiment, scheduler 423 is configured to limit the rate and burst of the traffic exiting service home NPU 403 to the maximum rate and burst, respectively, of the virtual interface QoS.

According to one embodiment, each virtual adjacency includes a virtual adjacency translation map for mapping physical adjacency IDs (included as part of the metadata of each received packet) into physical transport link IDs, which identify the physical transport links that the packets are to be transmitted over. Thus, the virtual adjacency translation maps enable traffic of the virtual interface to be load balanced over multiple physical transport links. In the illustrated example, virtual adjacency 411 includes virtual adjacency translation map 426 for mapping physical adjacency IDs into physical transport link IDs.

Conventionally, each physical transport link applies its physical transport link level QoS without any regards to the QoS provisioned at the virtual interface. The result is that packets may be prioritized in a manner that is inconsistent with the prioritization required by the QoS provisioned at the virtual interface. Further, the congestion handling of the packets may not be consistent with the QoS provisioned at the virtual interface level. To further exacerbate the problem, the prioritization and congestion handling at each physical transport link may produce a different result, and thus, traffic belonging to the same virtual interface may have transmission characteristics that are inconsistent when they are transmitted over the physical transport links. Embodiments of the present invention overcome these limitations by propagating the QoS application results from the service home NPU to the physical NPUs.

According to one embodiment, virtual adjacency 411 is configured to encapsulate the QoS application results of each packet onto the packet prior to sending the packet to a physical NPU. In the illustrated example, virtual adjacency 411 encapsulates the physical transport link ID, color, and priority of packet 413-B into physical transport link ID 450, color 451, and priority 452, respectively, of packet 413-C and sends it to physical NPU 404.

According to one embodiment, physical NPU 404 includes a plurality of virtual adjacencies, each corresponding to a virtual interface. Each virtual adjacency is configured to apply on the packets the physical transport link level QoS associated with a physical transport link. Contrary to a conventional physical transport link level QoS application, the virtual adjacencies of physical NPU 404 apply the physical transport link level QoS using the QoS application results that are included in the packets.

In response to receiving a packet, physical NPU 404 determines which virtual adjacency to send the packet to based on the virtual adjacency ID included in the packet. In the illustrated example, physical NPU 404 receives packet 413-C, and based on the identifier included in virtual adjacency ID 440, sends the packet to virtual adjacency 412.

In order for an optional policer at the physical transport link to be coupled with the optional policer of the service home NPU, the virtual adjacency at the physical NPU needs to maintain a provisioned link-to-policer map, where the transport link ID is used as an index to retrieve/access a policer. As illustrated, virtual adjacency 412 includes optional link-to-policer map 437 which maps a physical transport link ID (included as part of an incoming packet) to one of optional policers 434. Policers 434 are configured to apply policing policies of the virtual interface that virtual adjacency 412 is associated with. Policers 434 perform operations similar to those performed by policer 424. For example, policers 434 may maintain a packet color that was determined by policer 424. Alternatively, policers 434 may demote an incoming packet marked with a color "green" to a color "red". Conversely, policers 434 may promote an incoming packet marked with a color "red" color to a color "green".

According to one embodiment, policers 434 are configured to either maintain or demote a packet color, and not promote a packet color. In this way, the throughput flowing through the physical transport link can be capped at the maximum rate and maximum burst that had already been enforced by service home NPU 403, thus honoring the virtual interface QoS that is provisioned at the virtual interface level. Color demotion may be caused by various reasons, for example, the packet rate enforced by service home NPU 403 may be too high for virtual adjacency 412 to handle. In response to determining a packet does not adhere to a predetermined rate, policer 434 drops/discards the packet. Alternatively, in response to determining a packet adheres to the predetermined rate, policer 434 marks the packet (i.e., assigns it a color and priority) based on the current packet rate. Again, this may be the same or demoted color.

In an embodiment where policers 434 are implemented, the color assigned by one of policers 434 is used by queue manager 431. In an alternate embodiment where policers 434 are not implemented, the packet color included as part of the incoming packet is used by queue manager 431. In embodiments where policers 434 are implemented, they must use the aggregate token bucket assigned to the physical transport link so that the traffic from multiple virtual interfaces going over the same physical transport link updates the same token bucket.

In order for a packet at the physical transport link to be sent to the corresponding virtual interface queue, the virtual adjacency at the physical NPU needs to include a provisioned link-to-queue map, where the transport link ID is used as an index to retrieve/access a set of VI-Qs associated with the virtual interface. For example, queue manager 431 first uses the physical transport link ID (included in the packet) to index link-to-queue map 438 to identify a set of queues from VI-Qs 435 that are associated with the virtual interface. Queue manager 431 then uses the packet priority to select a queue from the identified set of queues.

In one embodiment, each queue is associated with a plurality of drop profiles. In one embodiment, queue manager 431 is to select a drop profile from the plurality of drop files associated with the selected queue based on the packet color. Queue manager 431 then applies the selected drop profile on a congestion algorithm (e.g., WRED) to determine whether the packet should be dropped or inserted into the selected queue. In response to determining not to drop a packet, queue manager 431 inserts the packet into the selected queue.

According to one embodiment, physical NPU 404 includes scheduler 443 configured to schedule/select a queue to transmit from. Each physical transport link may be used to transport traffic belonging to multiple virtual interfaces. In one embodiment, in order to guarantee a minimum bandwidth for each virtual interface, physical NPU 404 is configured with a plurality of bandwidth share parameters 436, each corresponding to a virtual interface. Each bandwidth share parameter defines a minimum bandwidth on the physical transport link that is guaranteed to the corresponding virtual interface. In one embodiment, scheduler 433 uses bandwidth share parameters 436 to ensure that packets are scheduled such that each virtual interface is guaranteed a minimum bandwidth on a corresponding physical transport link.

In one embodiment, in response to determining traffic from a particular virtual interface is to be transmitted, scheduler 433 selects a queue from the set of queues that are associated with the virtual interface. Scheduler 433 selects the queue based on the virtual interface QoS provisioned for the virtual interface. It should be noted that packet which are sent by service home NPU 403 are guaranteed to be in adherence to the maximum rate and maximum burst limit of the virtual interface QoS due to the scheduling decisions of scheduler 423. In other words, scheduler 423 of service home NPU 403 would not have scheduled and sent the packet unless the packet was determined to be in adherence to the maximum rate and maximum burst limit required by the virtual interface QoS. The minimum rate and minimum burst of the virtual interface QoS provisioned for the virtual interface, however, are enforced by virtual adjacency 412 of physical NPU 404.

It is to be noted that by combining policing, queueing, and scheduling results from service home NPU 403 and physical NPU 404, embodiments of the invention provide a mechanism for hierarchical coupling of QoS behavior on the virtual interface with that of the physical transport links. It is to be noted that the service home NPUs, such as service home NPU 403, are decoupled from the physical NPUs, such as physical NPU 404. As such, service home NPUs are well suited to be implemented on virtual machines. In embodiments where the service home NPU and the physical NPUs are implemented on different network devices, traffic for the virtual interface is redirected from its physical nodes (e.g., ingress NPU 410) with virtual interface tags to the virtualized service home NPU (e.g., service home NPU 403) for virtual interface QoS enforcement, and eventually queued to the physical transport link on the physical node (e.g., physical NPU 404). As described above, ingress NPU 410 and physical NPU 404 may be implemented at the same physical node (i.e., network device).

FIG. 5 is a flow diagram illustrating method 500 for applying a QoS on a virtual interface over a multi-path transport topology. For example, method 500 can be performed by service home NPU 403. Method 500 can be implemented in software, firmware, hardware, or any combination thereof. The operations in this and other flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 5, at block 505 a service home NPU receives a packet (e.g., packet 413-B) of a virtual interface, wherein the virtual interface is provisioned with a virtual interface QoS, and wherein the virtual interface comprises a hierarchy of sub interfaces. At block 510, the service home NPU selects a virtual adjacency (e.g., virtual adjacency 411) from a plurality of virtual adjacencies maintained by the service home NPU based on metadata (e.g., metadata included in virtual adjacency ID 440) included in the packet, wherein each virtual adjacency is associated with the virtual interface or a sub interface of the virtual interface.

At block 515, the service home NPU uses the selected virtual adjacency to select a queue from a set of virtual interface queues of the selected virtual adjacency based on a priority of the packet, and store the packet in the selected queue. For example, if the virtual adjacency is associated with a sub interface, then the virtual adjacency is configured to apply that sub interface's sub interface QoS to perform policing, queue congestion management, and packet queueing. Alternatively, if the virtual adjacency is associated with the virtual interface, then the virtual adjacency is configured to apply the virtual interface QoS to perform policing, queue congestion management, and packet queueing at the virtual interface level (i.e., the top of the hierarchy).

At block 520, the service home NPU performs hierarchical scheduling based on the virtual interface QoS to select the queue from all sets of virtual interface queues of all virtual adjacencies, and sending the packet from the selected queue and a transport link identifier (ID) to a physical network processing unit (NPU) that is to forward the packet over a physical transport link identified by the transport link ID, to cause the physical NPU to apply a QoS on the packet based on the transport link ID. For example, scheduler 423 performs the operations of the scheduling nodes of each level of the scheduling cone, and the packet from the winning queue at the top of the scheduling cone is transmitted to the physical NPU.

Figure 6:
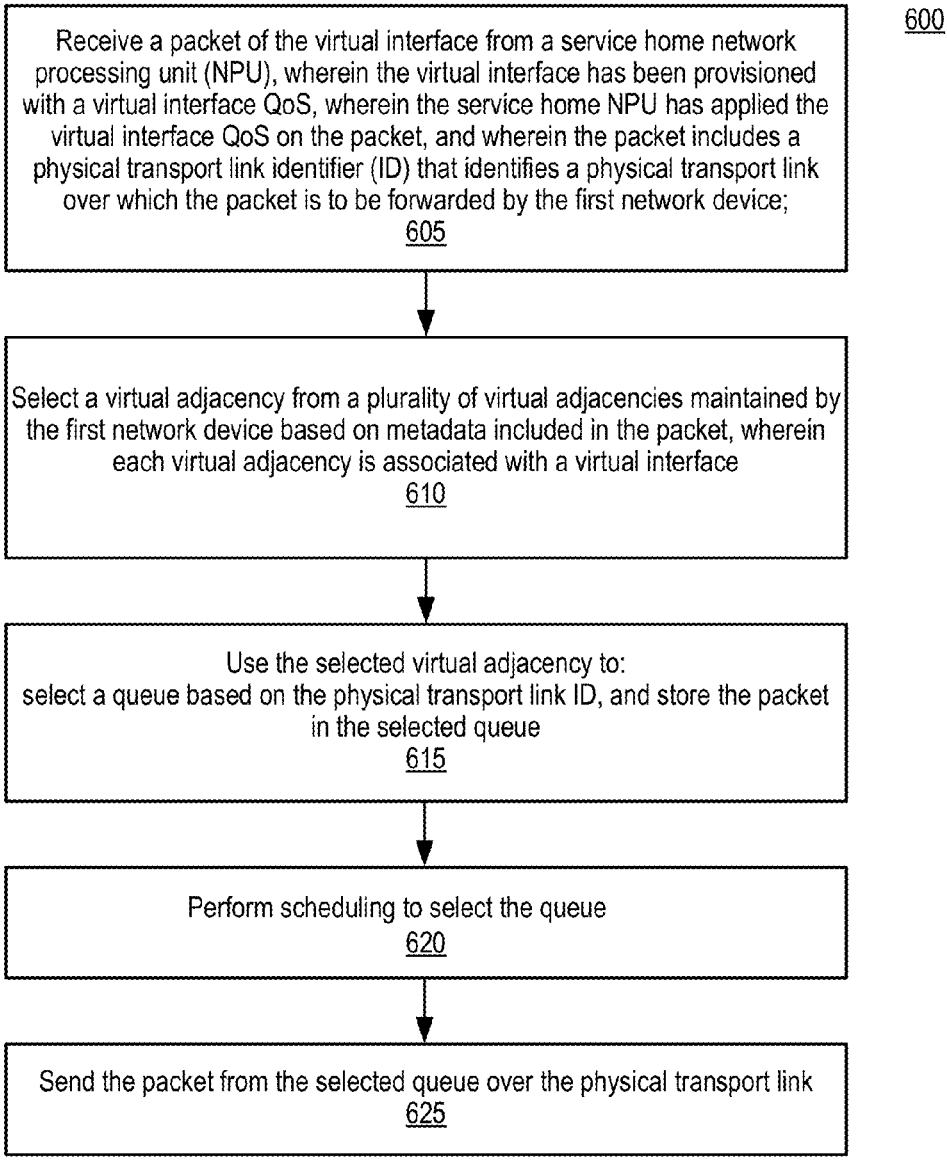
FIG. 6 is a flow diagram illustrating a method for applying QoS on a virtual interface over a multi-path topology, according to one embodiment.

FIG. 6 is a flow diagram illustrating method 600 for applying a QoS on a virtual interface over a multi-path transport topology. For example, method 600 can be performed by physical NPU 404. Method 600 can be implemented in software, firmware, hardware, or any combination thereof. Referring now to FIG. 6, at block 605 a physical NPU receives a packet (e.g., packet 413-C) of the virtual interface from a service home network processing unit (NPU) (e.g., service home NPU 403), wherein the virtual interface has been provisioned with a virtual interface QoS, wherein the service home NPU has applied the virtual interface QoS on the packet, and wherein the packet includes a physical transport link identifier (ID) that identifies a physical transport link over which the packet is to be forwarded by the first network device.

At block 610, the physical NPU selects a virtual adjacency (e.g., virtual adjacency 412) from a plurality of virtual adjacencies maintained by the physical NPU based on metadata (e.g., metadata contained in virtual adjacency ID 440) included in the packet, wherein each virtual adjacency is associated with a virtual interface.

At block 615, the physical NPU uses the selected virtual adjacency to select a queue based on the physical transport link ID, and store the packet in the selected queue. For example, virtual adjacency 412 of physical NPU 404 uses the physical transport link ID to index link-to-queue map 438 to select set of VI-Qs 435 that are associated with the virtual interface, and queue manager 431 uses the packet priority to select a queue from VI-Qs 435 based on the packet priority.

At block 620, the physical NPU performs scheduling to select the queue. For example, scheduler 433 determines that based on the bandwidth share parameter associated with the virtual interface indicating it is time to transmit from the virtual interface, scheduler 433 identifies the set of VI-Qs associated with the virtual interface, and selects a queue from the identified set of VI-Qs based on queue priority. At block 625, the physical NPU sends the packet from the selected queue over the physical transport link.

Figure 7A:
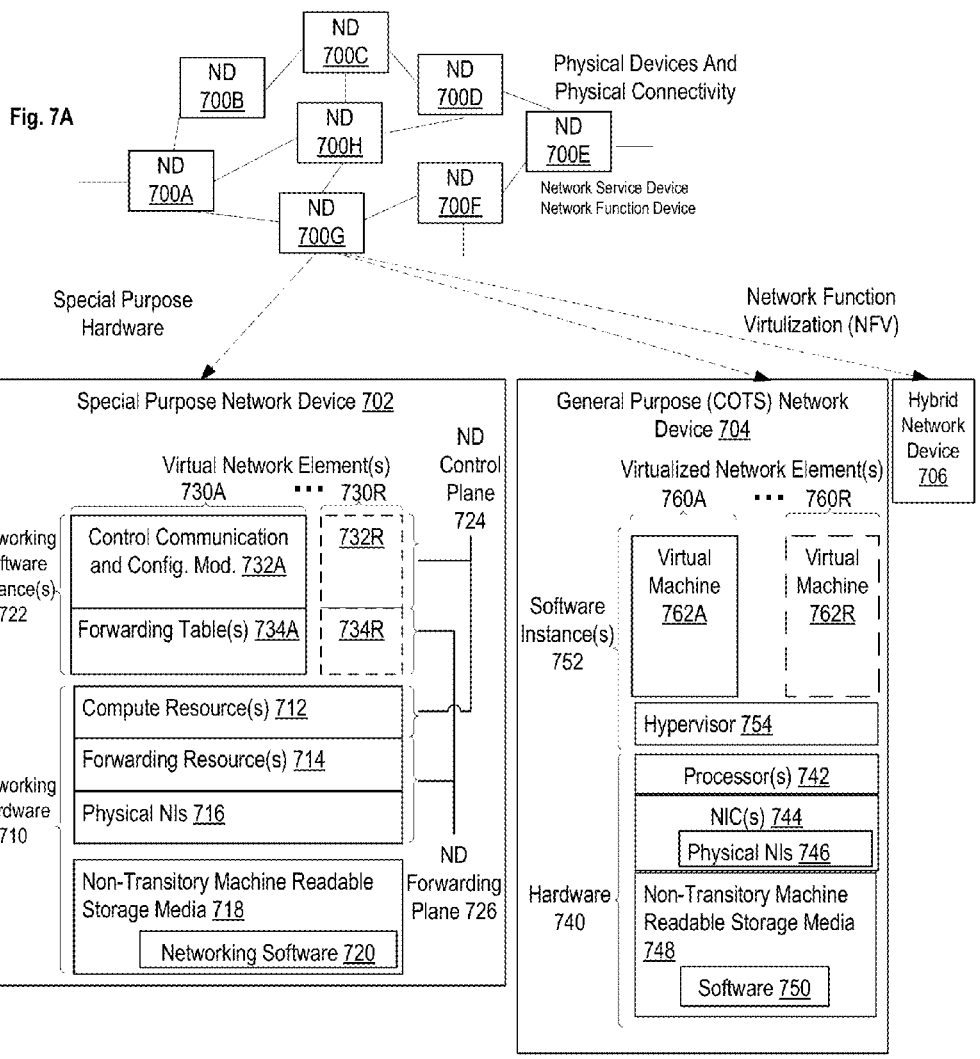
FIG. 7A illustrates connectivity between network devices (NDs) within an exemplary network, as well as three exemplary implementations of the NDs, according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code which be executed by networking hardware 710, cause networking hardware 710 to perform operations of one or more embodiments of the present invention as part networking software instances 722.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

Figure 7B:
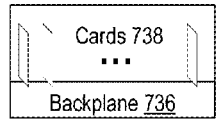
FIG. 7B illustrates an exemplary way to implement the special-purpose network device 702 according to some embodiments of the invention.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate a hypervisor 754 (sometimes referred to as a virtual machine monitor (VMM)) and one or more virtual machines 762A-R that are run by the hypervisor 754, which are collectively referred to as software instance(s) 752. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 762A-R, and that part of the hardware 740 that executes that virtual machine (be it hardware dedicated to that virtual machine and/or time slices of hardware temporally shared by that virtual machine with others of the virtual machine(s) 762A-R), forms a separate virtual network element(s) 760A-R.

The virtual network element(s) 760A-R perform similar functionality to the virtual network element(s) 730A-R. For instance, the hypervisor 754 may present a virtual operating platform that appears like networking hardware 710 to virtual machine 762A, and the virtual machine 762A may be used to implement functionality similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the virtual machine(s) 762A-R differently. For example, while embodiments of the invention are illustrated with each virtual machine 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 754 includes a virtual switch that provides similar forwarding services as a physical Ethernet switch. Specifically, this virtual switch forwards traffic between virtual machines and the NIC(s) 744, as well as optionally between the virtual machines 762A-R; in addition, this virtual switch may enforce network isolation between the VNEs 760A-R that by policy are not permitted to communicate with each other (e.g., by honoring virtual local area networks (VLANs)).

Software 750 can include code which be executed by processor(s) 742, cause processor(s) 742 to perform operations of one or more embodiments of the present invention as part virtual machine 762A-R.

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device for applying Quality-of-Service (QoS) on a virtual interface over a multi-path transport topology, the method comprising:
   receiving a packet of the virtual interface, wherein the virtual interface is provisioned with a virtual interface QoS, and wherein the virtual interface comprises a hierarchy of sub interfaces;
   selecting a virtual adjacency from a plurality of virtual adjacencies maintained by the first network device based on metadata included in the packet, wherein each virtual adjacency is associated with the virtual interface or a sub interface of the virtual interface;
   using the selected virtual adjacency to
      select a queue from a set of virtual interface queues of the selected virtual adjacency based on a priority of the packet, and
      store the packet in the selected queue;
   performing hierarchical scheduling based on the virtual interface QoS to select the queue from all sets of virtual interface queues of all virtual adjacencies; and
   sending the packet from the selected queue and a transport link identifier (ID) to a physical network processing unit (NPU) that is to forward the packet over a physical transport link identified by the transport link ID, to cause the physical NPU to apply a QoS on the packet based on the transport link ID.

2. The method of claim 1, further comprising:
   generating the transport link ID based on metadata included as part of the packet.

3. The method of claim 1, further comprising using the selected virtual adjacency to generate a packet priority and a packet color for the packet, wherein the packet priority and the packet color are sent along with the packet to the physical NPU, to cause the physical NPU to use the packet color and packet priority to determine whether to drop the packet or to queue the packet, and to further cause the physical NPU to use the packet priority to select a queue from a set of virtual interface queues associated with the virtual interface at the physical NPU for queueing the packet.

4. The method of claim 1, wherein all traffic of the virtual interface is sent to the first network device, thereby allowing the first network device to enforce a consistent throughput over the virtual interface regardless of how many physical transport links the virtual interface traffic is directed to.

5. The method of claim 1, wherein the physical NPU is implemented at a second network device communicatively coupled to the first network device.

6. A first network device for applying Quality-of-Service (QoS) on a virtual interface over a multi-path transport topology, the first network device comprising:
   a set of one or more processors; and
   a non-transitory machine-readable storage medium containing code, which when executed by the set of one or more processors, cause the first network device to:
      receive a packet of the virtual interface, wherein the virtual interface is provisioned with a virtual interface QoS, and wherein the virtual interface comprises a hierarchy of sub interfaces;
      select a virtual adjacency from a plurality of virtual adjacencies maintained by the first network device based on metadata included in the packet, wherein each virtual adjacency is associated with the virtual interface or a sub interface of the virtual interface;
      use the selected virtual adjacency to
         select a queue from a set of virtual interface queues of the selected virtual adjacency based on a priority of the packet, and
         store the packet in the selected queue;
      perform hierarchical scheduling based on the virtual interface QoS to select the queue from all sets of virtual interface queues of all virtual adjacencies; and
      send the packet from the selected queue and a transport link identifier (ID) to a physical network processing unit (NPU) that is to forward the packet over a physical transport link identified by the transport link ID, to cause the physical NPU to apply a QoS on the packet based on the transport link ID.

7. The first network device of claim 6, wherein the non-transitory machine-readable storage medium further contains code, which when executed by the set of one or more processors, cause the first network device to:
   generate the transport link ID based on metadata included as part of the packet.

8. The first network device of claim 6, wherein the non-transitory machine-readable storage medium further contains code, which when executed by the set of one or more processors, cause the first network device to use the selected virtual adjacency to generate a packet priority and a packet color for the packet, wherein the packet priority and the packet color are sent along with the packet to the physical NPU, to cause the physical NPU to use the packet color and packet priority to determine whether to drop the packet or to queue the packet, and to further cause the physical NPU to use the packet priority to select a queue from a set of virtual interface queues associated with the virtual interface at the physical NPU for queueing the packet.

9. The first network device of claim 6, wherein all traffic of the virtual interface is sent to the first network device, thereby allowing the first network device to enforce a consistent throughput over the virtual interface regardless of how many physical transport links the virtual interface traffic is directed to.

10. The first network device of claim 6, wherein the physical NPU is implemented at a second network device communicatively coupled to the first network device.

11. A non-transitory computer-readable storage medium having computer code stored therein, which when executed by a processor of a first network device for applying Quality-of-Service (QoS) on a virtual interface over a multipath transport topology, cause the first network device to perform operations comprising:

receiving a packet of the virtual interface, wherein the virtual interface is provisioned with a virtual interface QoS, and wherein the virtual interface comprises a hierarchy of sub interfaces;

selecting a virtual adjacency from a plurality of virtual adjacencies maintained by the first network device based on metadata included in the packet, wherein each virtual adjacency is associated with the virtual interface or a sub interface of the virtual interface;

using the selected virtual adjacency to
select a queue from a set of virtual interface queues of the selected virtual adjacency based on a priority of the packet, and
store the packet in the selected queue;

performing hierarchical scheduling based on the virtual interface QoS to select the queue from all sets of virtual interface queues of all virtual adjacencies; and sending the packet from the selected queue and a transport link identifier (ID) to a physical network processing unit (NPU) that is to forward the packet over a physical transport link identified by the transport link ID, to cause the physical NPU to apply a QoS on the packet based on the transport link ID.

12. The non-transitory computer-readable storage medium of claim 11, wherein the computer code, when executed by the processor of the first network device, causes the first network device to perform further operations comprising:

generating the transport link ID based on metadata included as part of the packet.

13. The non-transitory computer-readable storage medium of claim 11, wherein the computer code, when executed by the processor of the first network device, causes the first network device to perform further operations comprising using the selected virtual adjacency to generate a packet priority and a packet color for the packet, wherein the packet priority and the packet color are sent along with the packet to the physical NPU, to cause the physical NPU to use the packet color and packet priority to determine whether to drop the packet or to queue the packet, and to further cause the physical NPU to use the packet priority to select a queue from a set of virtual interface queues associated with the virtual interface at the physical NPU for queueing the packet.

14. The non-transitory computer-readable storage medium of claim 11, wherein all traffic of the virtual interface is sent to the first network device, thereby allowing the first network device to enforce a consistent throughput over the virtual interface regardless of how many physical transport links the virtual interface traffic is directed to.

15. The non-transitory computer-readable storage medium of claim 11, wherein the physical NPU is implemented at a second network device communicatively coupled to the first network device.

16. A method in a virtual machine for applying Quality-of-Service (QoS) on a virtual interface over a multi-path transport topology, the method comprising:

receiving a packet of the virtual interface, wherein the virtual interface is provisioned with a virtual interface QoS, and wherein the virtual interface comprises a hierarchy of sub interfaces;

selecting a virtual adjacency from a plurality of virtual adjacencies maintained by the virtual machine based on metadata included in the packet, wherein each virtual adjacency is associated with the virtual interface or a sub interface of the virtual interface;

using the selected virtual adjacency to
select a queue from a set of virtual interface queues of the selected virtual adjacency based on a priority of the packet, and
store the packet in the selected queue;

performing hierarchical scheduling based on the virtual interface QoS to select the queue from all sets of virtual interface queues of all virtual adjacencies; and sending the packet from the selected queue and a transport link identifier (ID) to a physical network processing unit (NPU) that is to forward the packet over a physical transport link identified by the transport link ID, to cause the physical NPU to apply a QoS on the packet based on the transport link ID.

17. The method of claim 16, further comprising:
generating the transport link ID based on metadata included as part of the packet.

18. The method of claim 16, further comprising using the selected virtual adjacency to generate a packet priority and a packet color for the packet, wherein the packet priority and the packet color are sent along with the packet to the physical NPU, to cause the physical NPU to use the packet color and packet priority to determine whether to drop the packet or to queue the packet, and to further cause the physical NPU to use the packet priority to select a queue from a set of virtual interface queues associated with the virtual interface at the physical NPU for queueing the packet.

19. The method of claim 16, wherein all traffic of the virtual interface is sent to the virtual machine, thereby allowing the virtual machine to enforce a consistent throughput over the virtual interface regardless of how many physical transport links the virtual interface traffic is directed to.

20. The method of claim 16, wherein the physical NPU is implemented at a second network device communicatively coupled to the virtual machine.

* * * * *